Nov. 26, 1963 V. T. GROVER ETAL 3,111,874
PUNCH PRESS HAVING EJECTOR AND DIVERGENT PRODUCT REMOVAL MEANS
Filed Dec. 17, 1958 4 Sheets-Sheet 1

INVENTORS
VICTOR THEODORE GROVER
JOHN PHILIP JAKOB
HUGO HERMAN KLUESENER
FRANK FREDERICK BORKMANN
BY
ATTORNEYS

INVENTORS
VICTOR THEODORE GROVER
JOHN PHILIP JAKOB
HUGO HERMAN KLUESENER
FRANK FREDERICK BORKMANN

BY Leland R. McCann
George W. Reiber
ATTORNEYS

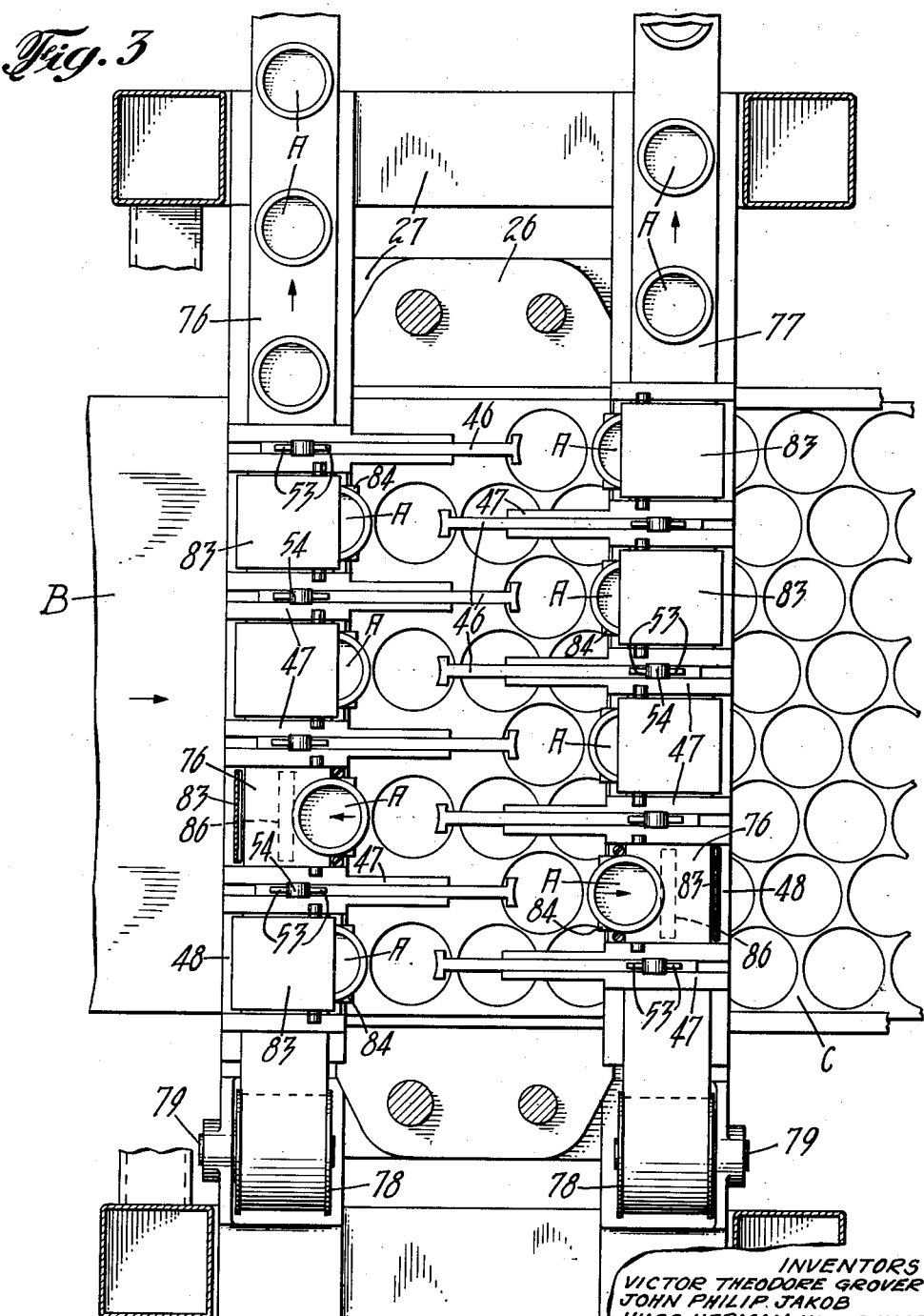

Nov. 26, 1963    V. T. GROVER ETAL    3,111,874
PUNCH PRESS HAVING EJECTOR AND DIVERGENT PRODUCT REMOVAL MEANS
Filed Dec. 17, 1958    4 Sheets-Sheet 4
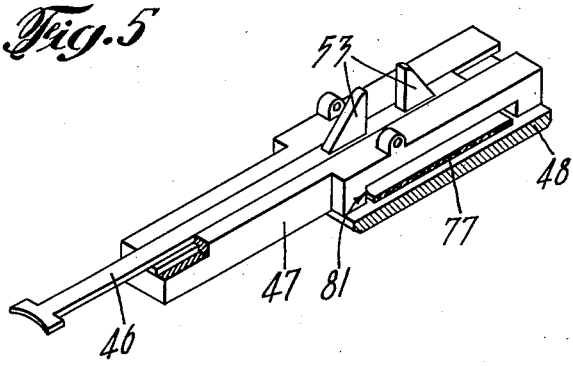
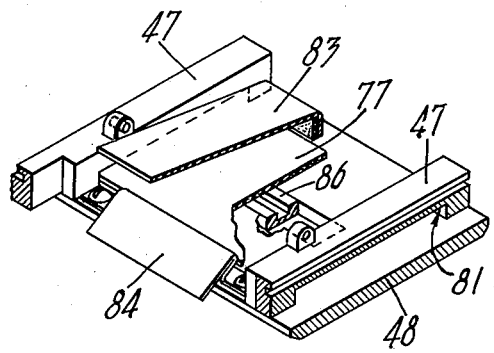
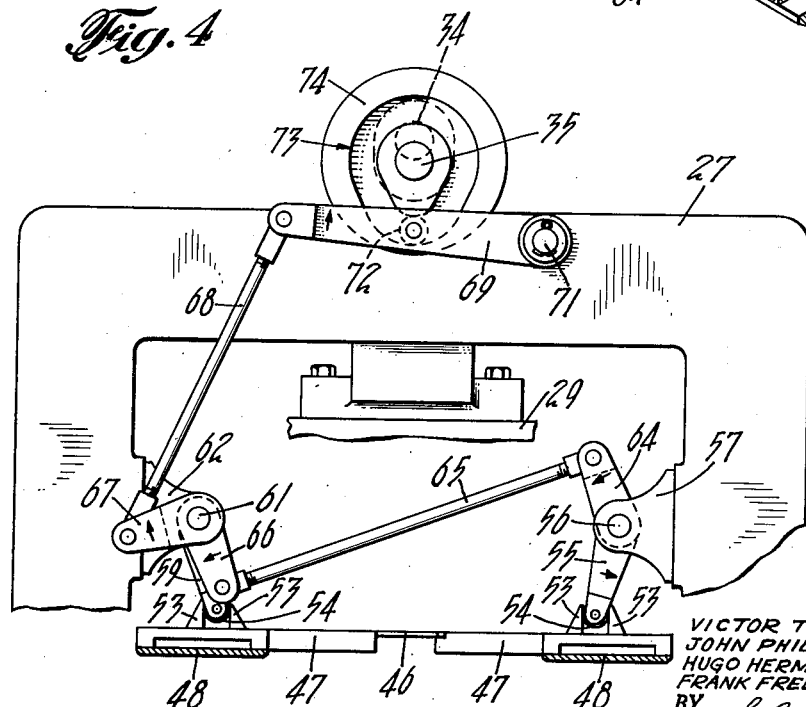
INVENTORS
VICTOR THEODORE GROVER
JOHN PHILIP JAKOB
HUGO HERMAN KLUESENER
FRANK FREDERICK BORKMANN
BY Leland R. McCann
George W. Reiber
ATTORNEYS 3,111,874
PUNCH PRESS HAVING EJECTOR AND DIVERGENT PRODUCT REMOVAL MEANS
Victor Theodore Grover, Maplewood, John Philip Jakob, Roselle, Hugo Herman Kluesener, Newark, and Frank Frederick Borkmann, Union, N.J., assignors to American Can Company, New York, N.Y., a corporation of New Jersey
Filed Dec. 17, 1958, Ser. No. 781,032
5 Claims. (Cl. 83—107)

The present invention relates to punch presses and the like machines for cutting and forming articles from sheet material and has particular reference to devices for discharging and delivering the articles from the presses.

An object of the invention is the provision of devices for discharging articles rapidly, at high speed, as they are cut from sheet material, preferably substantially continuous strips or webs, in a manner which permits of the discharge of the articles without interference with the material.

Another object is the provision of such devices which permits of the feeding of the material through the press in a horizontal plane to facilitate handling of exceedingly large sheets or long strips.

Another object is the provision of such devices which permits of the cutting of the articles from long strips, in transverse rows so that the cutting dies may be staggered if desired and the discharge of the articles effected at high speed.

Numerous other objects and advantages of the invention will be apparent as it is better understood from the following description, which, taken in connection with the accompanying drawings, discloses a preferred embodiment thereof.

Referring to the drawings:

FIG. 3 is a reduced scale sectional view taken substantially along the broken line 3—3 in FIG. 2, with parts broken away;

FIG. 4 is an elevational view taken substantially along a plane indicated by the line 4—4 in FIG. 1 and FIGS. 5 and 6 are perspective views of details of the press structure shown in FIG. 2.

As a preferred and exemplary embodiment of the instant invention the drawings illustrate a punch press for stagger row cutting and forming articles such as can or container ends or end members A (FIGS. 1, 2 and 3) from a substantially continuous strip or web B of tinplate, black iron or similar sheet metal material.

Figure 1:
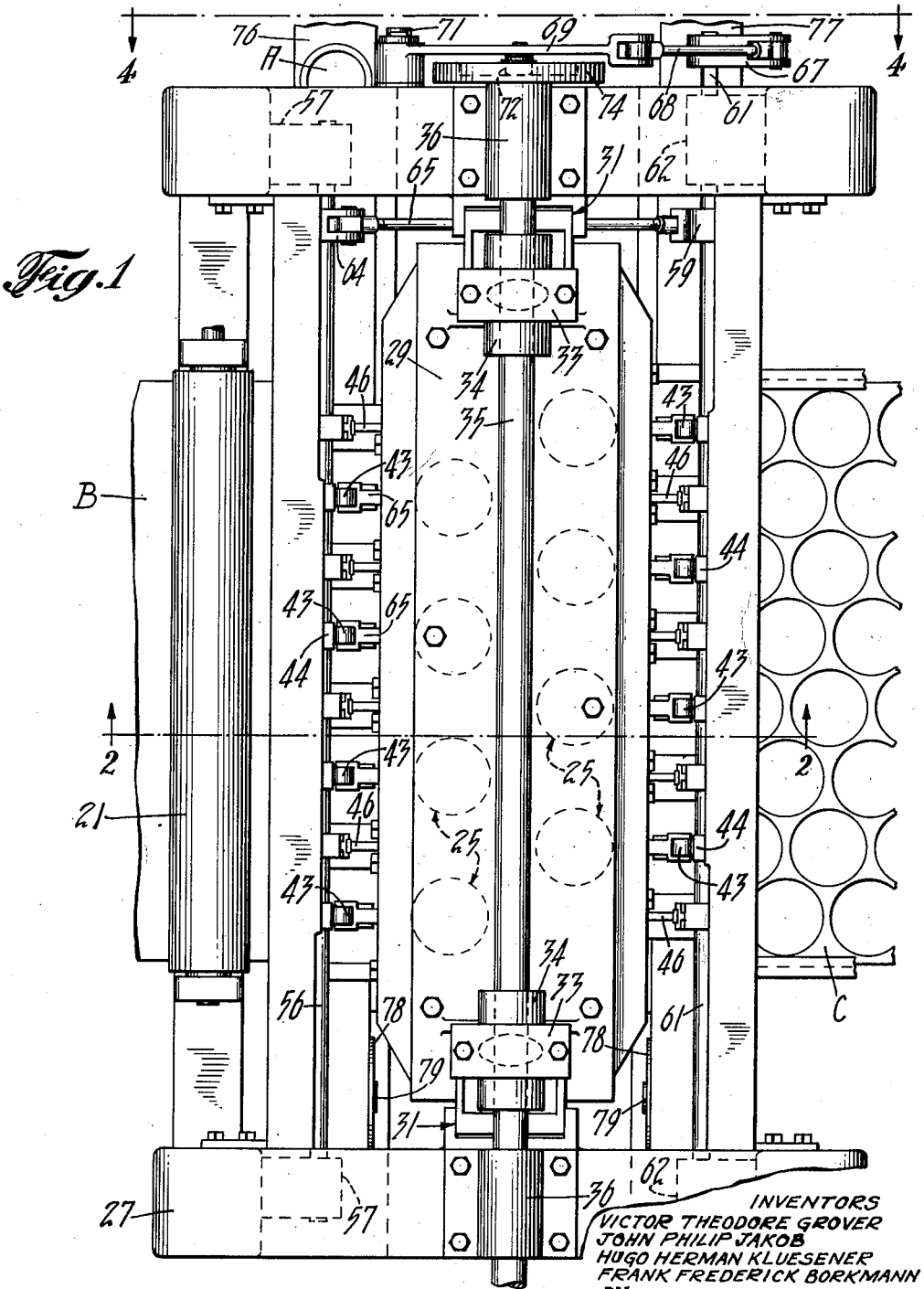
FIGURE 1 is a top plan view of a punch press embodying the instant invention, with parts broken away.
Figure 2:
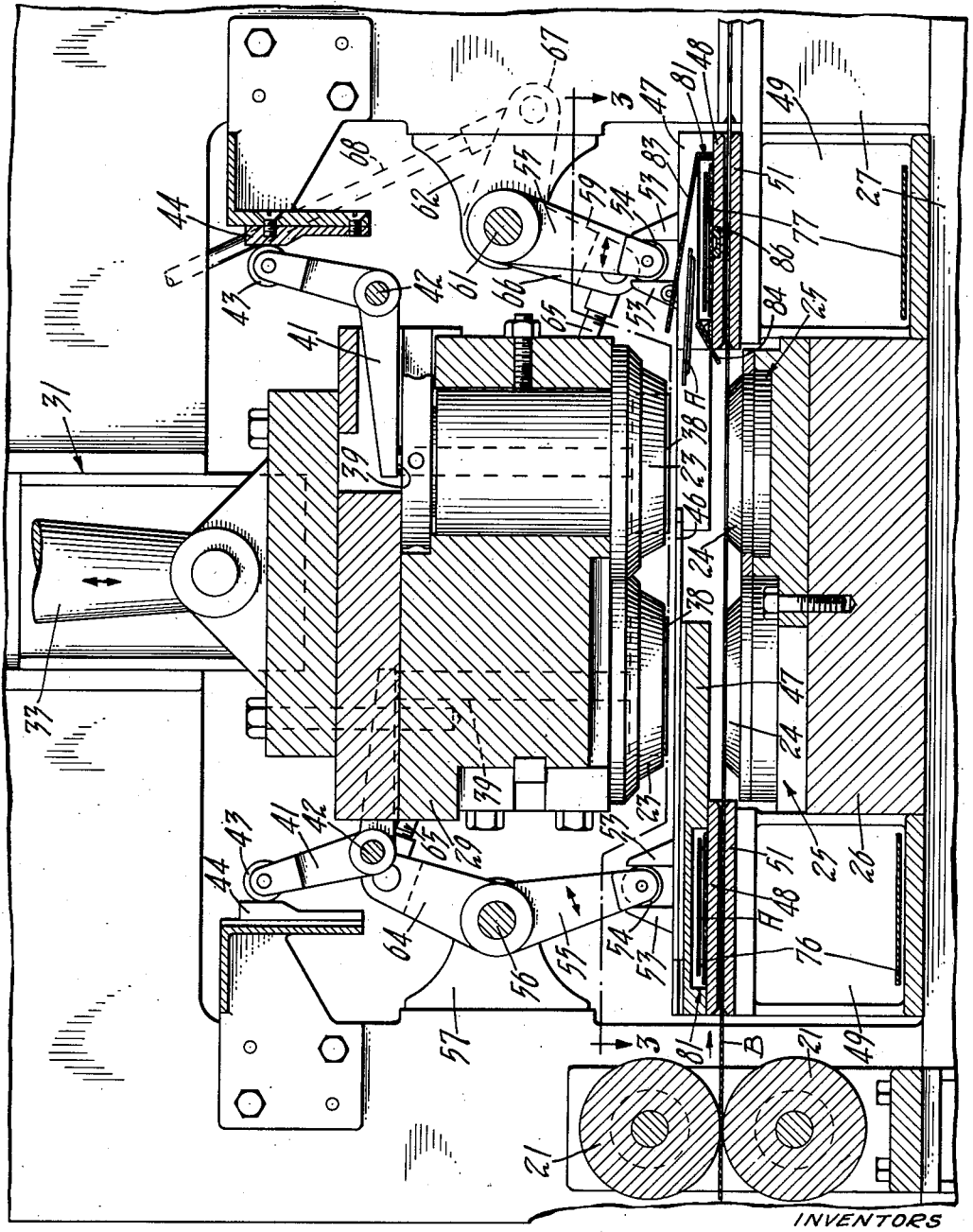
FIG. 2 is an enlarged sectional view taken substantially along the line 2—2 in FIG. 1, with parts broken away.

The strip B is fed into and through the press in step-by-step fashion by a conventional intermittent feed device which includes a pair of feed-rollers 21 (FIGS. 1 and 2). The strip is fed in a horizontal plane between upper and lower die members 23, 24 (FIG. 2) of a plurality of dies 25 arranged in two adjacently disposed rows extending across the path of travel of the strip B through the press. The dies in one row are arranged in staggered relation to the dies in the other row to produce in the strip B the conventional stagger layout or pattern extensively used in the can making industry.

The lower die members 24, of the dies 25 are secured to a bed plate 26 (FIGS. 2 and 3) which is supported on a frame 27 which is the main frame of the press. The upper die members or punches 23 of the dies 25 are secured in a vertically reciprocable punch head 29 which at its outer ends is guided in vertical slideways 31 (FIG. 1) formed in upright portions of the frame 27.

The head 29 is carried for reciprocation on a pair of spaced pitmans 33 (FIGS. 1 and 2) which at their upper ends are mounted on cranks 34 of a continuously rotated crank shaft 35 journaled in bearings 36 on the frame 27 (see also FIG. 4). The crank shaft 35 is rotated in any suitable manner in time with the advancement of the strip B through the press, the crank shaft making one revolution for each intermittent advancement of the strip B. This is a conventional punch press construction and operation.

After an advancement of the strip B, the upper die members 23, through rotation of the crank shaft 35, move down through a cutting and forming stroke toward and into the lower die members 24 in the conventional manner and thereby cut from the strip B interposed between them a plurality of can end blanks and form the blanks into the can ends A as mentioned hereinbefore. Each die 25 produces one can end A. The removal of the can ends thus leaves the strip B punched full of staggered holes as a strip skeleton or scrap portion C as shown in FIGS. 1 and 3.

As the punch head 29 moves up through a return stroke, withdrawing the upper die members 23 from the lower die members 24 for a repeat operation on the strip B after another advancement thereof, the formed can ends A cling to and move up with the upper die members 23. During this return stroke, these can ends A are knocked out of the upper die members 23 by conventional knockout elements which are used in most all punch presses.

The knock-out elements preferably comprise knock-out pads 38 (FIG. 2) which are disposed in the upper die members 23 and which are attached to the lower ends of vertical stems 39 which extend up through the upper die members and project up beyond their upper ends. The upper ends of the stems 39 engage against bell cranks 41 mounted on pivot pins 42 carried in the punch head 29. Outside of the punch head 29 the bell cranks 41 carry cam rollers 43 which on the up stroke of the punch head, engage against stationary cams 44 secured to the machine frame. These cams 44 rock the bell cranks 41 and thereby push the knockout pads 38 down against the can ends in the upper die members 23 and thereby eject the can ends from the members. This is a usual knockout structure.

In order to prevent the ejected can ends A from falling back onto the lower die members 24, they are kicked out laterally from each row of dies, in opposite directions at a level above the plane of the strip B and are rapidly delivered away from the strip so as to prevent interference therewith. Because the strip B is in a horizontal relation and extends in solid form and skeleton scrap form on both sides of the dies 25 it is difficult to discharge the can ends A and carry them away without interference with the strip. In the instant invention, this is satisfactorily accomplished by providing a reciprocable kickout element 46 (FIGS. 2, 3 and 5) for each die 25.

The kickout elements 46 are disposed in a horizontal position and are arranged in two rows disposed adjacent to and outwardly from the double row of dies 25. The kickout elements for one row of dies 25 are disposed adjacent the opposite row of dies and extend across this opposite row between its dies 25 and in lineal alignment with the dies 25 of the first row to discharge the can ends from the first row as shown in FIG. 3. These kickout elements 46 are elongated slides or expelling fingers which are reciprocable in slide blocks 47 mounted in a pair of rows on a pair of support plates 48 (FIGS. 2, 3 and 5) which extend across and above the path of travel of the strip B. At their ends these plates 48 are mounted on brackets 49 supported on the main frame 27. These plates 48 and similar auxiliary plates 51 disposed below them in spaced relation thereto serve as guides for the strip B which passes between them (see FIG. 2).

Reciprocation of the kickout elements or fingers 46 in their slide blocks 47 is effected by cam action in time with the vertical reciprocation of the punch head 29, as shown in FIG. 4. For this purpose, each kickout element 46 is provided with a pair of spaced upright lugs 53 which confine a roller 54. The rollers 54 for one row of kickout elements 46 (at the left in FIG. 2) are carried on depending arms 55 which are secured to a rocker shaft 56 which extends across the path of travel of the strip B and which at its ends are journaled in bearings 57 attached to the main frame 27.

The rollers 54 for the opposite row of kickout elements 46 (at the right in FIG. 2) are carried on depending arms 59 which are secured to a rocker shaft 61 disposed in parallelism with the rocker shaft 56 and journaled at its ends in bearings 62 attached to the main frame 27.

In order to effect simultaneous reciprocation of all of the kickout elements 46, and to actuate the elements of one row in an opposite direction to that of the other row, the rocker shaft 56 is provided with an upright rocker arm 64 (FIGS. 2 and 4) which is connected by a link 65 to a depending rocker arm 66 on the rocker shaft 61. The rocker shaft 61 also carries an actuating arm 67 which is connected by a link 68 to a cam lever 69 mounted on a pivot pin 71 secured in the main frame 27. Intermediate its ends, the lever 69 carries a cam roller 72 which operates in a cam groove 73 of a face cam 74 mounted on and rotating with the crank shaft 35.

Hence during the cycle of rotation of the crank shaft 35, i.e. on the punch head up or return stroke portion of the cycle, the cam 74 rocks the depending arms 55, 59 in opposite directions, toward each other, and this slides the kickout elements 46 toward each other in time with the ejection of the can ends A from the upper die members 23. The result of this action is that the kickout elements or expelling fingers 46 disposed along the row of dies 25 at the right as viewed in FIG. 3 engage the edges of the falling can ends ejected from the row of dies 25 at the left as viewed in FIG. 3, and kicks or discharges the ends out of the die section of the machine in a direction opposite to and above the path of travel of the strip B. In a similar manner the fingers 46 disposed along the other row of dies 25 at the left in FIG. 3, engage the falling can ends ejected from the row of dies 25 at the right in FIG. 3, and kicks or discharges the ends out of the die section of the machine in the same direction as the path of travel of the strip B and at a level above the scrap portion of the strip.

The can ends A from each row of dies 25 are thus discharged in row formation with the two rows traveling laterally in opposite directions. These discharged can ends A are received on a pair of horizontally disposed endless delivery belts 76, 77 (FIGS. 1, 2, 3 and 5) the upper runs of which extend across the path of travel of the strip B at a level above the plane of the strip. The belt 76 is disposed adjacent and in parallelism with the row of dies 25 at the left in FIG. 3 and receives can ends from this row of dies. In a similar manner the belt 77 is disposed adjacent and in parallelism with the row of dies 25 at the right in FIG. 3 and receives can ends from this row of dies.

The belts 76, 77 operate over idler pulleys 78 mounted on short shaft 79 carried in the main frame 27. These belts 76, 77 travel through clearance openings 81 (FIGS. 2 and 5) in the kickout element slide blocks 47, and extend to any suitable place of deposit for the can ends. The belts preferably are actuated outside the machine at their delivery ends, at a linear speed sufficient to carry an entire row of can ends away from the dies 25 before a subsequent row of can ends is ejected for discharge to the belts.

In order to facilitate smooth transfer of the can ends to the belts 76, 77 angularly disposed guide plates 83 (FIGS. 2, 3 and 6) are provided adjacent each die 25 in a relation overhanging the belts and extending down along the outer edge of the belt to serve as a stop for the can ends. Along the inner edge of the belts a short inwardly and downwardly inclined shelf 84 is provided adjacent each die 25 to guide the can ends onto the belts in case the ends fall too low during the kickout operation.

The instant mechanism is intended for high speed operation and to insure against bouncing of the can ends when they are discharged onto the belts 76, 77 at high speed, magnets 86, preferably permanent magnets, are provided under the top runs of the belts. These magnets 86 are secured in recesses formed in the plates 48 as best shown in FIGS. 2 and 6. The magnets attract and hold the can ends in place on the belts as soon as they are received on the belts and permit travel of the can ends with the belts as the latter operate to deliver the can ends to their place of deposit.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:
1. A high speed punch press comprising
a frame structure for supporting web material in substantially horizontal position,
means for intermittently advancing said web over said frame structure,
a pair of parallel leading and trailing rows of dies mounted on said frame structure and disposed in staggered relation transversely of the web for cutting two parallel rows of individual articles from said web,
said dies each comprising relatively movable upper and lower die members between which said web is advanced, with said upper die member having one position vertically spaced from said web, and having surfaces thereon to which a cut article will frictionally adhere,
means synchronized with said web advancing means for actuating said dies during web dwell to thereby cut said articles from said web and leave perforated web scrap,
a knockout member operatively associated with each of said upper die members for ejecting an adhering cut article to fall freely therefrom while said upper die member is in said one position,
kickout means disposed above said web adjacent each upper die member for engaging each ejected article while unsupported and transferring the articles of the leading row in the direction of web travel and the articles of the trailing row in the opposite direction through substantially horizontal paths vertically spaced from said web,
means for actuating all of said kickout means while said upper die members are in said one position and after the articles are ejected therefrom,
and conveying means at the ends of said article paths respectively, for engaging and transferring the respective article rows transversely of the direction of web travel, thereby preventing engagement of any of said articles with said advancing web and web scrap.

2. The punch press as defined in claim 1 wherein said kickout means includes an elongated expelling finger reciprocably mounted in a slide block adjacent each die, said fingers being disposed in a pair of parallel staggered rows transversely of the web, said rows of fingers being respectively interdigitated with said rows of dies with each finger row being aligned with the respective die row remote therefrom, and further including means to reciprocate said fingers simultaneously to thereby engage and transfer said ejected articles in unison.

3. The punch press as defined in claim 2 wherein said conveying means comprises a pair of discharge conveyors disposed transversely above said web adjacent said article paths in parallelism with said finger and die rows for receiving and delivering said transferred articles from the press.

4. An punch press of the character defined in claim 3 wherein said discharge conveyors are a pair of continuously actuated endless belts respectively disposed adjacent each of said die rows, said belts having a linear speed sufficient to deliver a full row of articles from a said row of dies before the next full row of articles is discharged from said row of dies.

5. A punch press of the character defined in claim 3 having guide means extending from each of said dies to said discharge conveyors adjacent said dies to guide the articles discharged from the dies into position on each said discharge conveyors, said guide means comprising upper and lower inclined plates diverging from said conveyors above and below said horizontal paths and extending toward said dies.

References Cited in the file of this patent
UNITED STATES PATENTS

| | | |
|---|---|---|
| 521,793 | Heys | June 26, 1894 |
| 735,119 | Leavitt | Aug. 4, 1903 |
| 907,690 | Harbeck | Dec. 22, 1908 |
| 1,202,596 | Shepard | Oct. 24, 1916 |
| 1,503,829 | Heald | Aug. 5, 1924 |
| 1,560,794 | Furber | Nov. 10, 1925 |
| 1,920,999 | Murch | Aug. 8, 1933 |
| 1,925,915 | Allsworth | Sept. 5, 1933 |
| 2,355,556 | Peterson | Aug. 8, 1944 |
| 2,417,556 | Kramer | Mar. 18, 1947 |
| 2,576,295 | Good | Nov. 27, 1951 |
| 2,591,237 | Collis | Apr. 1, 1952 |
| 2,627,236 | Angell | Feb. 3, 1953 |
| 2,893,489 | Thompson | July 7, 1959 |
| 2,897,952 | Buccicone | Aug. 4, 1959 |